W. T. SEARS.
DRIVE MECHANISM FOR DRILLING MACHINES.
APPLICATION FILED JULY 6, 1918.
1,368,295.
Patented Feb. 15, 1921.
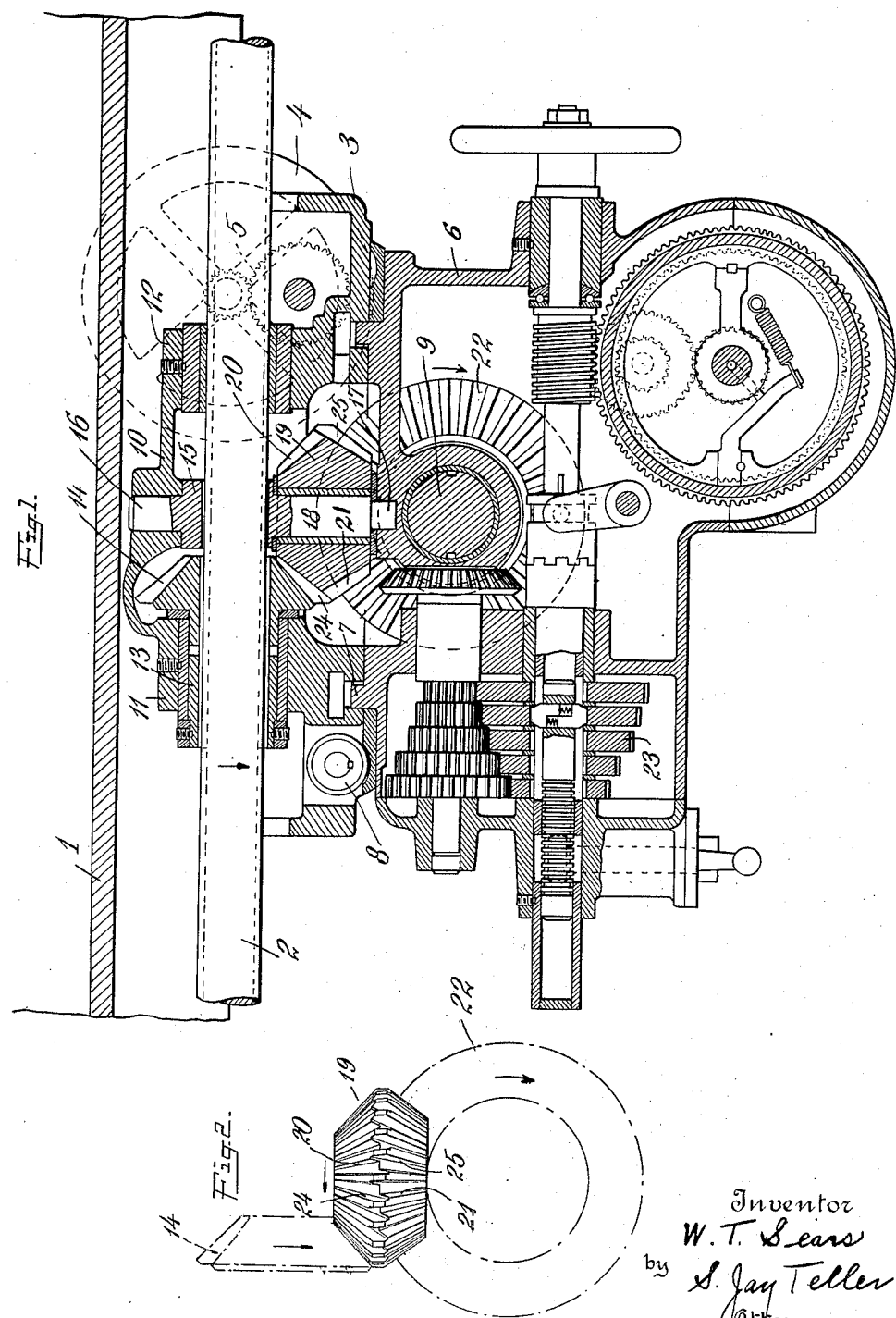
Inventor
W. T. Sears
by S. Jay Teller
Attorney

UNITED STATES PATENT OFFICE.

WILLARD T. SEARS, OF BROOKLYN, NEW YORK, ASSIGNOR TO NILES-BEMENT-POND COMPANY, OF NEW YORK, N. Y., A CORPORATION OF NEW JERSEY.

DRIVE MECHANISM FOR DRILLING-MACHINES.

1,368,295.

Specification of Letters Patent. Patented Feb. 15, 1921.

Application filed July 6, 1918. Serial No. 243,662.

*To all whom it may concern:*

Be it known that I, WILLARD T. SEARS, a citizen of the United States, residing at Brooklyn, in the county of Kings and State of New York, have invented certain new and useful Improvements in Drive Mechanism for Drilling-Machines, of which the following is a specification.

This invention relates particularly to a drive mechanism of the type set forth in my copending application for drilling machines, Serial No. 206,780, filed December 12th, 1917. In accordance with the present invention I provide an improved construction for the double bevel gear forming a part of the drive mechanism.

In the accompanying drawing, which illustrates the preferred embodiment of the invention:

Figure 1 is a horizontal sectional view showing parts of a drilling machine, these parts including the drive mechanism to which the invention relates.

Fig. 2 is a detail view showing the double bevel gear and the other bevel gears which mesh therewith.

The construction illustrated is in many respects the same as that set forth in my aforesaid copending application, and for this reason a very brief description of the general features thereof will be sufficient.

1 represents the horizontal arm along which extends a horizontal rotatable power shaft 2. Slidably mounted on the arm is a saddle 3 which may be moved by suitable mechanism including a hand wheel 4 and gearing 5.

A spindle head 6 is connected with the saddle and preferably is capable of angular adjustment with respect thereto about a transverse horizontal axis. The head is supported and guided by an annular tongue 7 fitting an annular groove in the saddle. The head may be angularly adjusted about the aforesaid transverse horizontal axis by means of a worm 8 meshing with worm teeth formed at the rear of the head.

Rotatably mounted in the head is a drill spindle 9 which is normally vertical but which can be moved to an inclined position when the head is angularly moved. A drilling tool or tap may be connected with the spindle 9 in any usual way.

Secured to the rear of the saddle is a bracket 10 provided with bearings 11 and 12. Fitting within the bearing 11 is a sleeve 13 having a bevel gear 14 connected to it and preferably formed integrally therewith. The sleeve 13 surrounds and is splined to the arm shaft 2 and the shaft fits and is supported by the bearing 12.

A transverse horizontal yoke 15 is provided, this yoke having at its ends trunnions 16 and 17 which are seated respectively in apertures formed in the bracket 10 and in the body part of the head 6. The common axis of these trunnions is coincident with the transverse axis of swiveling of the head. The yoke is provided with an opening through which the shaft 2 extends. The front part of the yoke is in the form of a bearing pin 18 which serves as a support for a double bevel gear 19, which is integral and which has two sets of oppositely inclined teeth 20 and 21. The teeth 20 at one side mesh with the aforesaid gear 14, and the teeth 21 at the other side mesh with a gear 22 which is splined on the spindle 9. It will be seen that by this construction power may be transmitted from the shaft 2 to drive the spindle 9. Inasmuch as the axis of the bevel gear 19 is coincident with the axis of adjustment of the head 6, this adjustment may be effected without interfering with or breaking the power connection.

The spindle 9 is longitudinally movable for preliminary adjustment and for feeding, the spindle having, as already stated, a splined connection with the gear 22. This longitudinal movement may be effected by any usual or preferred mechanism such for instance as that indicated in a general way by 23. As this mechanism constitutes no part of my present invention, detailed description is omitted.

The numbers of the teeth 20 and 21 on the two sides of the gear 19 are the same but the angles of inclination are slightly different. It is desirable to locate the spindle 9 as close as possible to the arm shaft 2 and for this reason the two sets of teeth 20 and 21 are placed close together, with the spaces between them communicating respectively with each other.

In cutting the teeth serious difficulty would be encountered if it were attempted to cause the respective teeth of the two opposite sets to exactly aline with each other. In making the bevel gear, the teeth of one set must be cut first and then the teeth of the other set, and practically, because of difficulties of adjustment and inaccuracies of machine construction, the cutter forming the teeth of the second set would reduce and mutilate to some extent the ends of the teeth of the first set. As shown in the drawing, the driving gear 14 and the driven gear 22 respectively are of different diameters and the sets of teeth thereon, respectively, therefore have different angles of inclination. The sets of teeth 20 and 21 on the double gear 19 correspond to the sets of teeth on the gears 14 and 22 respectively. The individual teeth of such respective sets on the gear 19 accordingly have slightly different cross sectional forms at the central plane of the gear as a result of the different angles of inclination. If the teeth of the respective sets were cut in exact alinement, the teeth of one set being of different cross sectional form from those of the other set would necessarily result in the cutting away of the teeth of the greater cross sectional area at both sides thereof when cutting those of the less cross sectional area. Such operation would of course spoil the form of the said larger teeth and particularly their driving faces. The mutilation of the teeth 20 or 21 or both, with the resultant reduction of bearing surfaces, would seriously reduce the power transmitting capacity of the gearing and thus make larger gearing necessary. Such larger gearing would be seriously objectionable as it would necessitate locating the spindle 9 farther from the shaft 2.

In order to avoid any objectionable mutilation of the gear teeth, such as I have referred to, and in order to insure the existence of complete unbroken working faces and the maximum bearing and wearing surfaces on the teeth, I slightly offset the teeth of the two sets as indicated in Fig. 2. This offsetting is sufficient to cause all mutilating or reducing of the gear teeth to take place on the back and normally inoperative faces thereof. Practically always the gear 22 and the spindle 9 must be driven in the clockwise direction as indicated by the arrow in Fig. 2. In order to effect driving in this direction the gears 19 and 14 must be rotated in the directions indicated by the respective arrows. It will be noted that the relative offsetting of the teeth 20 and 21 is such as to leave the rear or driven faces 24 of the teeth 20 unimpaired, and is such as to leave the front or driving faces 25 of the teeth 21 unimpaired. It will be seen that the faces 24 extend continuously past the central plane of the gear, forming small notches in the rear sides of the teeth 21. Similarly, the faces 25 extend in the opposite direction past the central plane of the gear, forming small notches in the front sides of the teeth 20. Thus the normal working faces of the teeth are continuous and unbroken and are longer than the opposite normally inoperative faces whereby the full driving and wearing capacity of the gear is attained. The opposite notched faces of the teeth 20 and 21 are not normally used for driving. They may be occasionally used, as for instance, for withdrawing a tap, but such use is usually without load. It will be noted that these normally ineffective faces are entirely correct in shape and can therefore be used, when occasion arises, to drive the spindle backward. But such backward driving of the spindle is necessary so infrequently as to avoid any excessive wear on the shortened bearing surfaces of the teeth.

What I claim is:

1. A double bevel gear having two opposite sets of teeth, each tooth of each set extending integrally into the adjacent tooth of the opposite set and the normal working face of each tooth of each set being longer than the other face of such tooth, such long working face of each tooth being formed by projecting such face through the rear of the body of the adjacent tooth on the opposite set at the junction of the said two teeth.

2. A double bevel gear having two opposite sets of teeth arranged with the respective spaces between the teeth of the two sets communicating with each other, each tooth of each set being an integral continuation of and offset from the adjacent tooth of the other set in such manner that the normal working face of each tooth of each set is continuous and unbroken from end to end and the other face is reduced by the formation of the continuous and unbroken working face of the adjacent tooth of the other set.

3. A double bevel gear having two opposite sets of teeth of different inclination respectively, the teeth of such respective sets being of different cross sectional form corresponding to the different angles of inclination, each tooth of each set being an integral continuation of and offset from the adjacent tooth of the other set in such manner that the normal working face of each tooth of each set is continuous and unbroken from end to end and the other face is reduced by the formation of the continuous and unbroken working face of the adjacent tooth of the other set.

4. In combination, a driving bevel gear normally operating with a load in one direction, a driven bevel gear, and an intermediate bevel gear having two opposite sets of teeth meshing respectively with the driving and driven gears, each tooth of each set being an integral continuation of the adjacent tooth on the other set and the respective spaces between the teeth of the two sets communicating with each other, the normal working face of each tooth of each set being continuous and unbroken from end to end and longer than the other face which is reduced adjacent the junction of the two teeth by the formation of the continuous and unbroken working face of the adjacent tooth of the other set.

5. In combination, a driving bevel gear normally operating with a load in one direction, a driven bevel gear having teeth of different inclination from those of the driving bevel gear, and an intermediate bevel gear having two opposite sets of teeth, the teeth of each set being of different cross sectional form and corresponding to and meshing respectively with the driving and driven gears and arranged with the respective spaces between the teeth of the two sets communicating with each other, the normal working face of each tooth of each set being continuous and unbroken from end to end and the other face being reduced by the formation of the continuous and unbroken working face of the adjacent tooth of the other set.

6. In combination, a drill spindle normally rotatable in a predetermined working direction, a bevel gear for driving the spindle, a driving bevel gear normally rotatable in a direction corresponding to the working direction of the spindle rotation, and an intermediate bevel gear having two opposite sets of teeth meshing respectively with the said gears and arranged with the respective spaces between the teeth of the two sets communicating with each other, the normal working face of each tooth of each set being continuous and unbroken from end to end and longer than the other face which is reduced at the end adjacent the other set by the formation of the continuous and unbroken working face of the adjacent tooth of the other set.

In testimony whereof, I hereto affix my signature.

WILLARD T. SEARS.